Patented May 23, 1939

2,159,411

UNITED STATES PATENT OFFICE 2,159,411

SULPHITE WASTE LIQUOR-PHENOL-ALDEHYDE CONDENSATION PRODUCTS

Fredrick J. Wallace, Brooklyn, N. Y., assignor to Robeson Process Company, New York, N. Y., a corporation of New Jersey No Drawing. Application June 11, 1935, Serial No. 26,074. In France July 9, 1931

10 Claims. (Cl. 260—57)

This invention relates to manufacture of condensation products; and it comprises as a new material a condensation product of the characteristic organic materials of sulphite waste liquor with a phenol and formaldehyde; and it also comprises a method of making such materials wherein a phenolic body, such as phenol itself or a cresol, is admixed and reacted with the characteristic solids of sulphite waste liquor and with formaldehyde furfural or hexamethylenetetramine, the mixture being then allowed or caused to undergo condensation by successive internal reactions; all as more fully hereinafter set forth and as claimed.

I have found that the various phenols, such as phenol itself and the cresols, notably metacresol, go into reaction with the characteristic organic solids of sulphite waste liquor (the "lignosulphonic acid") to form complex bodies which, on treatment with formaldehyde, can be used to make new and valuable resins or resinous bodies. Many of these resinous bodies, unlike all other derivatives of sulphite waste liquor, are soluble in alcohol and the alcoholic class of solvents. The new bodies formed are of high molecular weight and are readily resinified, giving insoluble, infusible resins commercially useful. In intermediate stages, the materials are, as stated, soluble in alcohol. The reaction between the phenol and the lignosulphonic acids is considerably more rapid than the action of the formaldehyde and, although the actions are successive, in practice the three reacting bodies may be directly admixed. The final resinified products, although like in character to resins made from phenols and formaldehyde alone, are considerably more complex and have certain advantages, being better for a number of purposes.

In the manufacture of ordinary synthetic resins from various phenols and formaldehyde, as is known, condensation may be aided by the presence of acids, bases or salts, these bodies acting as catalysts. These may be here used. Condensation goes on progressively, although more or less step by step, the first products being water soluble and probably containing phenol alcohols while the final product, when condensation is carried far enough, is an inert resinous body. Materials of the nature described are on the market and in extensive use as varnishes and solid plastics.

In the present way of making resins the cost of operation and of the various products, intermediate and final, may be considerably cheapened as contrasted with the prior art and new materials produced for new uses.

In the materials produced under the present invention, the characteristic properties of sulphite waste liquor solids, which are well known, disappear and new properties result. As stated, the new materials in some stages of manufacture are soluble in alcohol.

In the manufacture of paper pulp by the sulphite process, wood is digested under pressure with a solution of acid calcium sulphite. When dolomitic lime is used, the liquid also contains magnesium acid sulphite. Sometimes, acid sodium sulphite is used. About half of the wood goes into solution, the other half remaining as pulp. The dissolved portion contains certain bodies which, for the sake of a name, are frequently termed calcium or magnesium or sodium salts of lignosulphonic acids. Pentosan compounds, etc., are also present. Bodies contained in the liquor possess an aldehydic character and are reactive and capable of being condensed with a phenol.

The characteristic organic solids of sulphite waste liquor are available on the market in the form of concentrated neutral liquid solutions, usually containing about 50 per cent solids. Similar preparations but of acid nature are marketed for tanning, etc., purposes. Sulphite waste liquor is also marketed as dry preparations. Either the dry or the liquid product is suitable for my purpose. The material is advantageously one which has been treated to remove the calcium, thereby liberating the lignosulphonic acids. This may be accomplished by precipitating the calcium with sulphuric acid or with oxalic acid, after which the calcium precipitates may be filtered off. Soluble sulphates or oxalates may be used, producing the corresponding lignosulphates.

The following examples illustrate various processes which may be used in preparing my resins. These processes may be varied to suit the particular characteristics desired in the final resin.

Example 1

In making one type of resin, one advantageous as a varnish resin, I take the following materials in proportions by weight as follows:

| | Parts |
|---|---|
| Sulphite waste liquor (50 per cent solids) | 40 |
| Commercial phenol | 40 |
| An aqueous solution of hexamethylenetetramine containing about 35 per cent solids by weight | 20 |

The mixture of these materials is heated in an autoclave at 50 pounds pressure for about three hours. The resinous material obtained is immiscible with the aqueous mother liquor. The immiscible resinous layer is then separated from the aqueous layer, dissolved in solvent and is then ready for use. The resinous solution thus formed is suitable for general covering purposes as a varnish or for insulating work.

The immiscible resinous layer is liquid at the reaction temperature but it becomes a soft solid when cooled to room temperature, remelting at about 160° F. It is permanently fusible and can be molded. When hot pressed at 100° F. with a pressure of 1000 pounds per square inch it flows readily taking the exact contour of the mold used.

These resins are soluble in alcohol and acetone, but are not soluble in benzol or ether. The solution of the separated resinous layer in ethyl alcohol yields coatings which after drying are hard and glossy. The dried coating is resistent to water.

In the above example the molar ratio of phenol to hexamethylenetetramine is about 8.5:1. Calculated as a phenol:formaldehyde ratio it represents 1.43 mols of phenol to 1 mol of aldehyde.

*Example 2*

Other useful resins may be obtained by the procedure of Example 1. A satisfactory resin for molding may be obtained using a mixture comprising

| | Parts |
|---|---|
| Lime-free sulphite waste liquor, neutralized with ammonia | 40 |
| Phenol | 40 |
| The above hexamethylenetetramine solution | 20 |

The mixture is heated as before. The immiscible resinous layer is separated and dissolved in a solvent such as an alcohol. Ethyl alcohol is advantageous. The solution forms a varnish suitable for general insulating work. The immiscible layer or its alcoholic solution may be mixed with a filler such as wood flour or asbestos, dried and the mass molded to desired shape under heat and pressure. A mold temperature of 325° F. and pressure of about 1000 pounds per square inch gives sound, properly shaped molded articles.

During the heating under pressure in the autoclave, the reaction temperature is about 300° F. At such temperatures the resinous layer is a thick, viscous, but flowable, liquid. The immiscible resinous layer, while still hot, may be mixed with the wood flour or other filler. The plastic mass thus obtained may be brought to a stiff consistency by adding appropriate amounts of filler.

The immiscible resinous layer if cooled to room temperature without the addition of either alcohol or filler, is a heavy, viscous liquid resin. It is insoluble in water, in benzol and in ether, but is soluble in ethyl alcohol and in acetone. It is permanently thermoplastic. By adding solid hexamethylenetetramine to the molding compositions containing it, heat-hardening compositions can be obtained adaptable for hot pressing into infusible shaped articles.

Coatings obtained by applying an alcoholic solution of this resin to the article to be coated and then baking the air-dried coating for several hours, are hard and resistant to solvents.

*Example 3*

A resin of the permanently fusible type can be made by taking 60 parts of the above lime-free sulphite cellulose liquor, 20 parts phenol and 20 parts by weight of a 40 per cent solution of formaldehyde. To the mixture is added 5 parts by weight of ammonium chloride. The whole is heated to 220° F. at atmospheric pressure for 8 hours. The resulting resin is poured out in slabs to cool, when the excess water drains off. The resin is light brown in color and has a melting point of 180° F. It is soluble with difficulty in all ordinary solvents except alcohol. An alcoholic solution forms a quick drying varnish giving a coating which has a glossy resinous appearance. The solid resin is of the permanently fusible type, but may be partially converted to the infusible type by addition of hardening agents. It is particularly suitable for the so-called "cold molding" work; dilution with a readily volatile solvent, mixing with asbestos or the like, molding and baking to remove the solvent.

In the above example, during the heating, most of the water is boiled off, and at the end of the reaction a molten resin substantially free of any mother liquor is obtained. When the molten resin is poured out in slabs, the remaining mother liquor stratifies and drains off. The water adhering to the surfaces of the hot resin quickly evaporates. The cooled, solid resin is sufficiently low in free moisture to permit pressure shaping without further drying, when it is "cold molded". When the resin is to be hot pressed and heat-hardened molded articles are to be obtained, the usual procedure is to grind the solid resin to a powder, add the hardening agent and other ingredients, dry the powder and hot press. The hardening agents and other ingredients may be added during the grinding step, as uniform, homogeneous molding powders are easily obtained in this way.

In the above example, a smaller amount of phenol is used; the molar ratio of phenol to actual formaldehyde being 1.25:1.

*Example 4*

Another useful resin is formed by reacting together 60 parts lime-free sulphite liquor, 20 parts phenol and 20 parts formaldehyde solution. To this is added 5 parts by weight of ammonium chloride. The whole is heated in an autoclave at 60 pounds pressure for 3 hours. The resulting immiscible layer is a dark brown, solid and fusible resin. Is is converted to an infusible form on heating to 400° F. and is suitable for molding work. The heat-hardened resin is insoluble in all of the ordinary organic solvents.

The dark brown solid resin obtained in this example softens at about 180° F. It is soluble in ethyl alcohol and acetone. By dissolving it in those solvents, quick drying varnishes are obtained. The air-dried coatings obtained from this varnish may be subsequently baked at 400° F to give hard, heat-set films. The so baked film is very resistant to water and the ordinary organic solvents.

In the above example, the molar ratios are the same as in Example 3 and ammonium chloride is likewise used as a catalyst. But here the reaction is effected under pressure at a somewhat higher temperature. By operating in this way, substantially all of the water may be directly eliminated from the resin. As a solid resin is the end product, practically all the water is removed by mere draining. The solid resin being warm, even the film coating of water upon its surfaces may be evaporated before the resin cools to room temperature. Also in this embodiment of the present invention the mixture in the autoclave being under pressure and quite hot, the autoclave may be "blown down" to directly evaporate the segregated water and other volatiles. That is, by gradually releasing the pressure to the atmosphere while the materials are hot, most of the water and other volatiles are readily evaporated leaving a cooled, hard resin. In this way, a quick cooling can be obtained to prevent further reaction and forfeiture of the fusibility of the resin. Checking the reaction by cooling or otherwise is important as the resin of this example is one which can be heat-hardened. While temperatures of about 400° F. are necessary for quick heat-hardening, nevertheless at the lower reaction temperatures there is a gradual forfeiture of fusibility if that heating is continued for a substantial time.

The resins obtained in Examples 3 and 4 are hard, brittle solids at room temperature and may be easily ground to give good molding powders. However, at the reaction temperatures employed in their formation, they are heavy, viscous liquids, immiscible with the aqueous mother liquor from which they can be easily separated.

*Example 5*

Another high grade resin may be obtained by reacting the materials in the following proportions:

| | Parts |
|---|---|
| Lime-free sulphite liquor (50 per cent solids) | 300 |
| Phenol | 150 |
| Formaldehyde (35 per cent solution) | 138.5 |
| Ammonium chloride | 34 |

The above materials are heated together under reflux for about 4 hours at atmospheric pressure. A dark brown resin separating from and immiscible with the aqueous mother liquor is obtained. At the reaction temperature this resin is a viscous heavy liquid which easily stratifies from the mother liquor. At room temperature this resin becomes a hard solid useful in making the various coating and molding compositions mentioned ante. It is soluble in ammoniacal ethyl alcohol but is substantially insoluble in most of the organic solvents. This resin is permanently fusible; melting at about 180° F. This resin may be mixed with small amounts of hexamethylenetetramine to produce heat-hardening molding compositions which, when hot pressed at 325° F. are transformed into insoluble, infusible shaped molded articles.

In the above example, the yield of solid resin is about 61 per cent.

Considerable variations are permissible in the percentages of materials, the times of heating and the pressures used in making my resins. Choice of catalysts is not limited to ammonium chloride, any material of acid nature or one producing an acid in the reaction mixture upon the application of heat, being suitable. The term "acid catalyst" is intended to cover this scope. For instance, hydrochloric acid may be used. But that acid vigorously catalyzes the reaction and when used, small amounts and lower temperatures are used to obtain useful resinous products.

A phenolic body such as one of the cresols, "cresylic acid" or xylenol may be substituted for the phenol (carbolic acid) and an aldehyde such as furfural may be used in lieu of the formaldehyde. As to using other aldehydes in lieu of formaldehyde, they should be selected with care as the specific results are not the same as with formaldehyde. For instance, acetaldehyde, particularly when used in relatively small amounts does not give specific results comparable with those obtained with formaldehyde. With formaldehyde, excellent final products are obtained and for that reason it is ordinarily used in commercial practice of the present invention.

As considerable variations are permissible in the present invention, the broad results and actions which are essential to these processes are to be taken into account in making such variations and adjusting the details. For one thing, the ligneous and resinous constituents of the sulphite waste liquor are segregated from the aqueous liquid thereof. That is, the characteristic organic materials (solids) of the sulphite waste liquor, are precipitated and recovered as valuable resinous materials useful with advantage in various arts. Those actions are inherent in the methods here employed.

In the illustrative embodiments of the present invention, given in the examples, ante, the treatment of the sulphite waste liquor there set forth causes a segregation of the ligneous and resinous constituents of the liquor. Those constituents, originally in solution therein, are precipitated from the liquor. The aqueous mother liquor, after this segregation, contains relatively little of those constituents. The recovery of the ligneous and resinous material in useful form, from the liquor by this segregation, is quite effective. A high yield of good resin is obtained.

The precipitated resins so obtained are useful in making varnishes and molding compositions. They are fusible and readily flow under heat and pressure. Some are heat-hardening resins so that after the flow, the heat sets or hardens the shaped resin; permanentizing its shape. For instance, the resin obtained in Example 4.

They are soluble in varnish solvents such as alcohol and acetone. As shown in Examples 1, 2, etc., the resin, after the mother liquor is withdrawn off, can be dissolved in the solvent. The segregation of resin from the free water is so effective, that the little free water adhering to the resin after draining off the mother liquor, does not interfere with making the varnish with alcohol. However, if desired, the wet resin may be dried to remove any trace of water which adheres to its exposed surface. In making molding compositions this is usually done; it being best to completely remove the free water when the resin is used for that purpose. This is effectively accomplished when the filler (wood flour, etc.) is impregnated with the alcohol solution of the resin as in Example 2 and the mixture dried. The alcohol facilities the complete removal of the remaining free water.

In most cases simple drying of the resin-filler mix (drying in a current of warm air, etc.) gives a sufficiently complete removal of free moisture; any slight trace of free moisture occluded in the resin being absorbed by the wood flour or other hygroscopic, water-absorbing filler used in the mixture. When the resin, per se, is to be hot pressed, it can be ground to a powder and the powder dried to remove the last traces of free moisture. In this way all occluded water can be eliminated. If the resin has been previously dissolved in alcohol, this precaution is not essential, the alcohol causing a homogenization which liberates the occluded water or other volatiles. They are then removed with the alcohol during the drying.

When the molding compositions, either with or without filler (fibers or like binders), so obtained are hot pressed, several actions occur in rapid succession; the final result being a shaped heat-set molded article. The mold first heats the resin softening and plasticizing it. The hot plasticized resin next flows under the pressure applied. Then the shaped resin is heat-hardened or set while still in the mold. That is, the resin is solidified after it has been shaped and before removing the article from the mold. It is the heat-setting property of the resins of Example 4 that renders them so advantageous in these molding compositions. A similar "setting" is obtained with the fusible resins of Example 3 if prior to molding they are mixed with a hardening agent as stated. Hexamethylenetetramine is an advantageous hardening agent for this purpose.

Thus in my methods of recovering and utilizing the ligneous and resinous constituents of sulphite waste liquor, the steps broadly involve segregating and precipitating the said solid organic material from the aqueous portion of the liquor, eliminating the free water, plasticizing the precipitate, forming it into desired shape while plastic and finally solidifying the resinous material, so that commercial articles of permanent solid form are obtained. This is particularly true in my manufacture of molded articles as described ante.

The molded articles obtained include and are composed of the ligneous and resinous matter precipitated from the sulphite waste liquor. That resinous matter derived by treating the concentrated sulphite waste liquor in the manner set forth, gives particularly good molded products. In the molded article the solidified and set resinous material firmly bonds together any of the solid particles of the other matter that is present, such as fillers, etc. With wood flour or other fibrous filler, the molded article is stronger, that is, more resistant to breaking or fracturing. The fiber is, so to speak, a "binder" in the sense that it reenforces the molded resin.

In the several steps, there is a more or less seriatim segregation of the resinous solids from the free moisture. In making the concentrated sulphite waste liquor here used, some of the free moisture is removed by evaporation. In treating the concentrated liquor as specified, to precipitate the resin there is a further segregation of free water. The segregation being effected in such a manner that physical separation such as mere decanting or draining, is possible. The described methods, of throwing down from the sulphite waste liquor of a valuable resinous precipitate which includes the resinous and ligneous constituents of the liquor, are advantageous. This precipitation is obtained by chemical reaction and the treatment with both carbolic acid and aldehyde causes such reactions that the precipitated resin has special valuable properties. The resins segregated by treatment with carbolic or cresylic acid alone while valuable, do not produce the special results obtained when aldehyde is used in conjunction with the phenol.

In treating the precipitate to further eliminate free moisture or water, the described methods are advantageous. As stated, the drying either with or without addition of alcohol may be used. The use of alcohol not only assists in eliminating any free moisture which has been occluded in the precipitated resin, but also plasticizes it.

Thus in my processes the precipitated resin may be plasticized and shaped in various ways. For instance, the precipitated resin may be plasticized by taking up in alcohol, the amount of alcohol and other added material such as absorbent filler (wood flour) being adjusted to give the desired plasticity, and the plastic material shaped; the shaped mass becoming set by subsequent evaporation of the solvent. This embodiment may be used in coating various articles to surface them with a coating of said resin. As in the case of applying the resin solution itself to the article to be coated, the setting or solidifying is primarily by evaporation of the solvent.

By slightly modifying this method wherein the precipitated resin is plasticized with solvent, solid shaped articles may be obtained. That is, by employing a little solvent and warming the mixture it can be sufficiently plasticized for shaping under heat and pressure to give shaped articles which set upon cooling. However, in making set molded articles by pressing, it is best to utilize the joint action of heat and pressure upon the fusible heat-hardening resin to obtain this plasticization, shaping while plastic and setting or solidifying of the shaped mass.

The relative amounts of phenol and formaldehyde, used in these treatments of the sulphite waste liquor, may be decreased and the resinous materials may still be segregated and recovered. But the treatment is not so effective. While the resinous material so obtained may be molded, the products obtained are not as good or satisfactory commercially, as those obtained by the described methods given ante. In fact the resins themselves lack some of the properties which distinguish the resins described ante; notably their high resistance to water. Also the precipitation of the ligneous and resinous material from the liquor is less marked and complete. Practically all the free water has to be segregated, that is, removed by evaporation. For instance, about 7 parts of concentrated sulphite waste liquor are treated with 1 part of phenol and 1 part of 40 per cent formaldehyde solution, the parts being parts by weight. This mixture can be boiled until upon cooling a solid resin, capable of being ground to a powder, is obtained. A major part of the water is removed during the boiling. So boiled and allowed to cool the mixture solidifies. The cooled resin is ground to a powder and molded under heat and pressure. To prevent blistering, the temperature and pressure of molding must be carefully controlled. For that reason, the better practice is to dry the powder before hot pressing. The moist, cooled resin may be admixed with fillers, wood flour, etc., during the grinding and the powder dried.

However, in such processes the yield of high grade resin is rather low and the bulk of the resin obtained upon evaporation is either water soluble or has relatively little resistance to water.

Even with a relatively large amount of strong catalysts, such as hydrochloric acid solution, to facilitate the reaction of these mixtures containing but little phenol and aldehydes, the segregation and precipitation is very little. Again, other methods of separating the resin are required. For instance, by heating and stirring together 200 parts of concentrated sulphite waste liquor, 10 parts of 30 per cent formaldehyde and 10 parts phenol and then adding 23 parts of 20° Bé. hydrochloric acid and continuing the heating, condensation products can be obtained. To separate the condensation product, a concentrated solution of sodium chloride is added. The yield of resin is low; about 80 parts of air-dried material being obtainable. The resinous product is, however, insoluble in acetone and alcohol. It cannot be used in making my varnishes. The air dried material, while it can be molded, is somewhat difficult to properly shape by the usual hot pressing procedure and the results obtained are not comparable with the high grade molded products obtained from the resins of Examples 1 to 5.

But the air-dried condensation product easily dissolves in aqueous solutions of alkali carbonate, alkali hydroxid or ammonia.

If the molded article is not required to be a high grade product such as is obtained from the molding compositions containing resins made by the methods of Examples 1 to 4, the entire segregation and removal of water may be by evaporation. For instance, the concentrated sulphite waste liquor may be further concentrated until a product is obtained which, upon cooling, is hard and solid. By subjecting such solid ligneous and resinous material, either with or without admixed wood flour, to sufficient heat and pressure to flow the resinous material, shaped articles can be obtained. That is, they contain sufficient water to plasticize the resin for shaping under the pressure, even though the relative amount of water is rather low. However, the molding temperature must be rather low, otherwise this small amount of water, mainly present as hygroscopic moisture, will be converted into steam and blister the molded article. The molded articles obtained in this way, although useful for some limited purposes, are in no way comparable with the pressure shaped heat-set molded articles obtained with the resins of Examples 1 to 4.

Somewhat better resins can be obtained if cresylic acid or carbolic acid (phenol) are used to facilitate segregation of the ligneous and resinous material from the sulphite waste liquor. By treating the concentrated sulphite waste liquor with those phenols, there is a segregation and precipitation of the resinous matter from the liquor. But to remove and eliminate the free water and moisture, most of it is removed by evaporation. However, the precipitation by chemical reaction with the phenol facilitates the segregation of the free water. In that reaction, the phenols react and combine with the ligneous and resinous material somewhat modifying its properties. In this embodiment of the broad invention, 50 parts of phenol may be added to 100 parts of concentrated sulphite waste liquor and the mixture heated until the resinous material is segregated and most of the water removed. The resins obtained by reacting the solids of sulphite waste liquor with phenol are less resistant to the action of water.

While the dry precipitated resinous materials obtained by treatment and reaction with phenol alone are useful, they are not as satisfactory for the present processes as those obtained by the joint action of phenol and aldehyde upon the ligneous and resinous material of the sulphite waste liquor.

Thus while there are many embodiments of my invention, the particular methods illustrated in Examples 1 to 4 are most advantageous in commercial practice. By treating the sulphite waste liquor with the phenol and formaldehyde as there specified, valuable resins of special properties are produced. Their fusibility, insolubility in water and aqueous alkaline solution and their solubility in alcohol and acetone, sharply distinguish them from the resins produced by the other methods mentioned ante.

To produce those high quality resins, 100 parts of the characteristic solids of sulphite waste liquor, between 67 and 200 parts of phenolic body and between 26 and 45 parts of formaldehyde, are heated to reaction temperature until said substances inter-react together, forming a new composite resinous body. The temperature is usually between 220° and 307° F. and is continued until the composite resin has the said properties. In that reaction, catalysts are used to facilitate the co-condensation of the three reactants into said composite resin having a complex molecular structure. All three of the reactions become combined in the final composite resin. In so combining, they lose their own characteristic properties and the new resin has a new set of somewhat different characteristic properties. For these purposes, ammonium chloride is an advantageous catalyst. With it there is a more or less automatically controlled acidification, giving the desired condensation and resinification. In other words, in the best embodiment of the present processes a acid catalyst is used. Hydrochloric acid may also be used as the acid catalyst, provided the amount is restricted and is sufficient to produce the desired condensation without giving so much resinification that the resin finally recovered is infusible. The term "acid catalyst" is intended to cover this scope, that is, any material of acid nature and one producing acid upon application of heat being suitable.

However, the said condensation may be sometimes effected using an alkaline catalyst. In Examples 1 and 2 hexamethylenetetramine is used to supply such alkaline catalyst. With alkaline catalysts, usually the resins obtained are permanently thermoplastic. In making heat-hardening molding compositions with them, usually a hardening agent such as hexa is added to the molding powder. On the other hand, with ammonium chloride as a catalyst, the resin obtained may be either of the permanently fusible type or of the heat-hardening type. Methods of producing each of these types of resin are set forth in Examples 3 and 4 respectively.

My new high grade resins are really modified phenol-formaldehyde resins containing the characteristic solids of sulphite waste liquor chemically fixed in a new resinous complex and formed a part thereof. These new brown colored resins are soluble in alcohol, but insoluble in water and in weakly alkaline aqueous solutions. They are fusible at temperatures well below the maximum temperatures used in ordinary commercial hot pressing operations. They are water resistant and non-bleeding in water. The hard infusible heat-set resins obtained from them are resistant to all the ordinary organic solvents as well as to water. My new hot pressed, molded articles and baked coatings are remarkably stable and resistant to the atmospheric and other conditions to which such articles are ordinarily subjected. In this respect, they are markedly different from any resinous product heretofore obtainable from sulphite waste liquor by any method wherein the ligneous and resinous solids thereof could be segregated and recovered as dry resins.

This application is a continuation-in-part of my copending application Serial No. 472,753, filed August 2, 1930.

What I claim is:

1. As an improvement in the manufacture of valuable condensation products from the characteristic solids of sulphite waste liquor, said products being soluble in alcohol but insoluble in water and in weakly alkaline aqueous solutions and being water-resistant and non-bleeding in water, the improved process which comprises mixing together the characteristic solids of sulphite waste liquor, a phenolic body and formaldehyde, heating the mixture to reaction temperature until said substances inter-react together to form a composite resinous body having said properties and recovering the resinous body thus produced, the said reactants being in such proportions and reacted under such conditions as to produce a resinous body having said physical properties and solubilities.

2. As an improvement in the manufacture of valuable condensation products from the characteristic solids of sulphite waste liquor, said products being soluble in alcohol but insoluble in water and in weakly alkaline aqueous solutions, the improved process which comprises mixing together about 100 parts of the characteristic solids of sulphite waste liquor, between 67 and 200 parts of a phenolic body and 26 to 45 parts of formaldehyde, heating the mixture to reaction temperature until said substance have inter-reacted together to form a composite resinous body having said properties, and recovering the composite resinous body thus produced.

3. The process of claim 2 in which said heating is effected under pressure, the temperature being between 297° and 307° F.

4. The process of claim 2 in which ammonium chloride is used as a catalyst.

5. The process of claim 2 wherein the said formaldehyde is supplied in the form of hexamethylenetetramine and the said reaction is effected in the presence of ammonia as a catalyst, said ammonia being derived from said hexamethylenetetramine during the reaction.

6. The improved process of making modified phenol-formaldehyde resins containing the characteristic solids of sulphide waste liquor chemically fixed in the resinous complex and forming a part thereof, which comprises mixing together approximately 60 parts of sulphite waste liquor, 20 parts of phenol, 20 parts of commercial formalin solution and about 5 parts of ammonium chloride, as a catalyst, heating the mixture to temperatures between 220° and 307° F. until a composite resin is formed, and then separating the said resin from the aqueous reaction mixture, thus producing a resin soluble in alcohol but insoluble in water and in weakly alkaline aqueous solutions.

7. The process of claim 6 wherein the reaction is effected at a temperature of about 220° F. at atmospheric pressures, the resin thus produced being light brown in color and fusible, and having an approximate melting point of 18° F. and being useful as a varnish resin.

8. The process of claim 6 wherein the reaction is effected at about 307° F. under a pressure of approximately 60 pounds per square inch, the resin thus produced being a dark brown solid fusible body, useful as an ingredient of molding compositions, and capable, upon subsequent heating to about 400° F., of being converted into infusible heat-hardened masses.

9. As a new improved and modified phenol-formaldehyde resin containing the characteristic solids of sulphite waste liquor chemically fixed in the resinous complex and forming a part thereof, a brown colored resin soluble in alcohol but insoluble in water and weakly alkaline aqueous solutions, said resin being fusible and being obtained by simultaneously reacting together 100 parts of said characteristic solids of sulphite waste liquor, 67 to 200 parts of phenolic body and 26 to 45 parts of formaldehyde, said resin being water-resistant and non-bleeding in water.

10. As a new improved and modified phenol-formaldehyde resin containing the characteristic solids of sulphite waste liquor chemically fixed in the resinous complex and forming a part thereof, a brown colored resin soluble in alcohol but insoluble in water and weakly alkaline aqueous solution, said resin being fusible, being water-resistant and non-bleeding in water, and being obtained by simultaneously reacting together said characteristic solids of sulphite waste liquor, a phenolic body and formaldehyde in such proportions and under such conditions as to yield a resinous body having the said physical properties and solubilities.

FREDRICK J. WALLACE.

---

CERTIFICATE OF CORRECTION.

Patent No. 2,159,411.  May 23, 1939.

FREDRICK J. WALLACE.

It is hereby certified that error appears in the printed specification of the above numbered patent requiring correction as follows: Page 2, second column, line 48, for the word "Is" read It; page 3, second column, line 55, for "facilities" read facilitates; page 4, second column, line 22, for "phonel" read phenol; page 5, second column, line 21, for "a" read an; page 6, first column, line 24, for the word "substance" read substances; same page, second column, line 11, claim 7, for "18° F." read 180° F.; and that the said Letters Patent should be read with this correction therein that the same may conform to the record of the case in the Patent Office.

Signed and sealed this 18th day of July, A. D. 1939.

(Seal)

Henry Van Arsdale,
Acting Commissioner of Patents.

in water and in weakly alkaline aqueous solutions and being water-resistant and non-bleeding in water, the improved process which comprises mixing together the characteristic solids of sulphite waste liquor, a phenolic body and formaldehyde, heating the mixture to reaction temperature until said substances inter-react together to form a composite resinous body having said properties and recovering the resinous body thus produced, the said reactants being in such proportions and reacted under such conditions as to produce a resinous body having said physical properties and solubilities.

2. As an improvement in the manufacture of valuable condensation products from the characteristic solids of sulphite waste liquor, said products being soluble in alcohol but insoluble in water and in weakly alkaline aqueous solutions, the improved process which comprises mixing together about 100 parts of the characteristic solids of sulphite waste liquor, between 67 and 200 parts of a phenolic body and 26 to 45 parts of formaldehyde, heating the mixture to reaction temperature until said substance have inter-reacted together to form a composite resinous body having said properties, and recovering the composite resinous body thus produced.

3. The process of claim 2 in which said heating is effected under pressure, the temperature being between 297° and 307° F.

4. The process of claim 2 in which ammonium chloride is used as a catalyst.

5. The process of claim 2 wherein the said formaldehyde is supplied in the form of hexamethylenetetramine and the said reaction is effected in the presence of ammonia as a catalyst, said ammonia being derived from said hexamethylenetetramine during the reaction.

6. The improved process of making modified phenol-formaldehyde resins containing the characteristic solids of sulphide waste liquor chemically fixed in the resinous complex and forming a part thereof, which comprises mixing together approximately 60 parts of sulphite waste liquor, 20 parts of phenol, 20 parts of commercial formalin solution and about 5 parts of ammonium chloride, as a catalyst, heating the mixture to temperatures between 220° and 307° F. until a composite resin is formed, and then separating the said resin from the aqueous reaction mixture, thus producing a resin soluble in alcohol but insoluble in water and in weakly alkaline aqueous solutions.

7. The process of claim 6 wherein the reaction is effected at a temperature of about 220° F. at atmospheric pressures, the resin thus produced being light brown in color and fusible, and having an approximate melting point of 18° F. and being useful as a varnish resin.

8. The process of claim 6 wherein the reaction is effected at about 307° F. under a pressure of approximately 60 pounds per square inch, the resin thus produced being a dark brown solid fusible body, useful as an ingredient of molding compositions, and capable, upon subsequent heating to about 400° F., of being converted into infusible heat-hardened masses.

9. As a new improved and modified phenol-formaldehyde resin containing the characteristic solids of sulphite waste liquor chemically fixed in the resinous complex and forming a part thereof, a brown colored resin soluble in alcohol but insoluble in water and weakly alkaline aqueous solutions, said resin being fusible and being obtained by simultaneously reacting together 100 parts of said characteristic solids of sulphite waste liquor, 67 to 200 parts of phenolic body and 26 to 45 parts of formaldehyde, said resin being water-resistant and non-bleeding in water.

10. As a new improved and modified phenol-formaldehyde resin containing the characteristic solids of sulphite waste liquor chemically fixed in the resinous complex and forming a part thereof, a brown colored resin soluble in alcohol but insoluble in water and weakly alkaline aqueous solution, said resin being fusible, being water-resistant and non-bleeding in water, and being obtained by simultaneously reacting together said characteristic solids of sulphite waste liquor, a phenolic body and formaldehyde in such proportions and under such conditions as to yield a resinous body having the said physical properties and solubilities.

FREDRICK J. WALLACE.

CERTIFICATE OF CORRECTION.

Patent No. 2,159,411. May 23, 1939.

FREDRICK J. WALLACE.

It is hereby certified that error appears in the printed specification of the above numbered patent requiring correction as follows: Page 2, second column, line 48, for the word "Is" read It; page 3, second column, line 55, for "facilities" read facilitates; page 4, second column, line 22, for "phonel" read phenol; page 5, second column, line 21, for "a" read an; page 6, first column, line 24, for the word "substance" read substances; same page, second column, line 11, claim 7, for "18° F." read 180° F.; and that the said Letters Patent should be read with this correction therein that the same may conform to the record of the case in the Patent Office.

Signed and sealed this 18th day of July, A. D. 1939.

(Seal)

Henry Van Arsdale,
Acting Commissioner of Patents.